Jan. 5, 1937.  E. R. WOLFERT  2,066,924
REGULATOR CONTROL SYSTEM
Filed Sept. 22, 1931
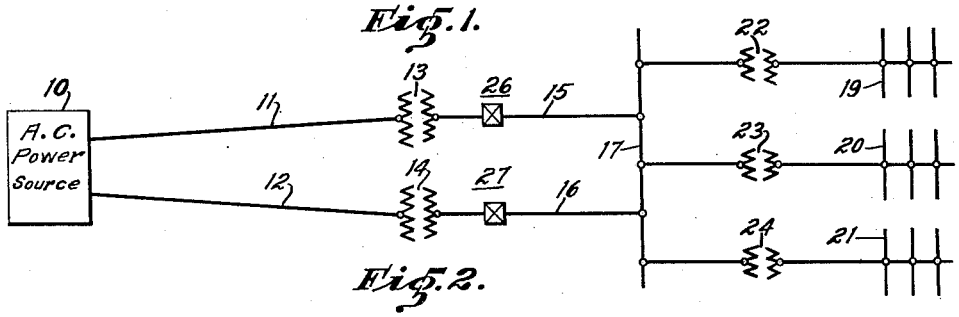
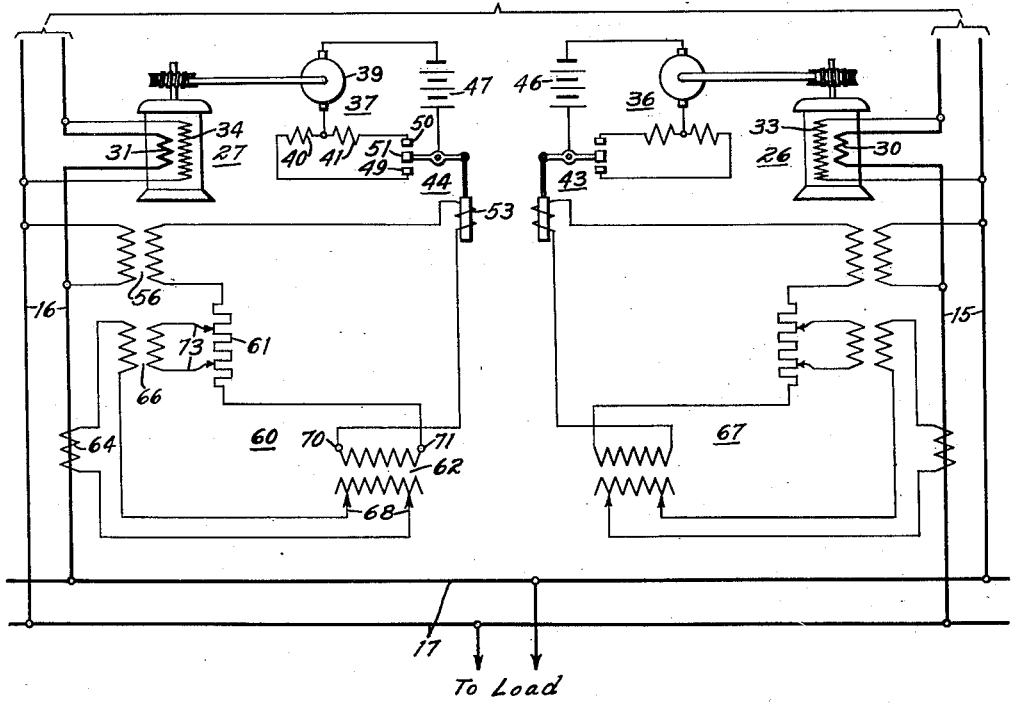
INVENTOR
Edward R. Wolfert.

Patented Jan. 5, 1937

2,066,924

UNITED STATES PATENT OFFICE 2,066,924

REGULATOR CONTROL SYSTEM

Edward R. Wolfert, Wilkinsburg, Pa., assignor to Westinghouse Electric & Manufacturing Company, a corporation of Pennsylvania Application September 22, 1931, Serial No. 564,299

4 Claims. (Cl. 171—119)

My invention relates to control systems for automatic regulators and has particular relation to compensating means for voltage regulators utilized in power transmission and distribution systems.

My invention is particularly applicable to the control of voltage-regulating means utilized in that type of power-transmission system in which a distribution or consumption circuit extends over a considerable area and is supplied at several different points from a plurality of feeder circuits.

In systems of this kind it is desirable to maintain a constant voltage on the distribution circuit, and in order to obtain this result, it is usual to provide a voltage-regulating means, such as a transformer tap-changing regulator or an induction regulator, in each of the several feeder circuits to control the voltage.

Since the regulators are usually located at a distance from the distribution circuit it is necessary to provide means for compensating the action of the regulating means for the voltage drop in the feeder circuit. This voltage drop varies in accordance with the current flowing in the circuit and is the vector sum of the resistance and reactance components of drop in the circuit impedance.

Where regulators are operated in separate feeder circuits supplying separate load areas it is customary to compensate for the resistance or ohmic component and the reactance or inductive component of voltage drop in the circuit. In such a system the effect of the line-drop compensators is to raise the voltage adjustment of the regulator in direct proportion to the vector sum of the power and the wattless components of current. That is, the ohmic element of the compensator causes the regulator to boost the voltage in proportion to the power component of current and the inductive element of the compensator causes the regulator to boost the voltage in direct proportion to the wattless component of current, these two components of current being in vector quadrature.

If a number of such regulators are employed in separate feeder circuits supplying current to the same distribution system or circuit, each regulator will act independently of the others to regulate the voltage of the distribution circuit. Since it is impossible to set the regulator exactly for the same voltage, one regulator will attempt to raise the voltage while others are attempting to lower the voltage of the distribution circuit thus resulting in an unstable regulator operation and causing the flow of wattless current between feeder circuits. An additional effect of this wattless or circulating current is to increase transmission losses and to otherwise cause unsatisfactory regulation of the system.

Thus, the feeder circuits which are already over-loaded will tend to take a larger share of the total load and the feeder circuits which are under-loaded will tend to take a lesser share of the total. If the impedance of the circuit between the parallel-connected feeders is of a sufficiently low value, the final result will be that the heavily loaded regulators will move to the maximum voltage position, and the lightly loaded regulators will move to the minimum voltage position.

In order to prevent circulating currents between the several individually-regulated feeder circuits connected in parallel, where the several regulators are closely positioned it has been customary to mechanically interconnect the regulators of these several circuits, so that they will be forced to operate together, or to compensate the control elements of the several regulators through interconnected current transformers associated with the several feeder circuits in such manner that the effect of circulating currents will act to stabilize the regulator operation by directly influencing the control circuits of the several regulators.

It is, however, undesirable or impractical to utilize either of these expedients in a power-distribution system of the type already described, in which system the several feeder-circuit regulators are of necessity rather distantly separated. While it is possible to overcome this unstable operation of regulators employed in a plurality of feeder circuits by causing the compensators to give the regulators a drooping voltage characteristic with an increase in load on the circuit, such compensation produces an undesirable voltage regulation of the system, and hence it, like the other expedients mentioned, is also unsatisfactory.

The improved compensating and control means of my invention provides for so compensating and controlling the operation of the several parallel-feeder-circuit regulators as to produce stable load conditions, without any direct mechanical or electrical connection between the regulators and without giving the regulators a drooping voltage characteristic with an increase in load on the feeder circuits.

An object of my invention, therefore, is to provide an improved means for automatically compensating the control of a plurality of voltage regulators, applied to a transmission system of the type described, in which stable operation of the regulating units in the several feeder circuits may be effected.

A further object of my invention is to provide means for compensating the control of a plurality of regulators for stable operation without the necessity of interconnecting the control circuits of the several regulating units.

Another object of my invention is to provide means for compensating the control of a plurality of regulators for stable operation without giving the regulator a drooping voltage characteristic with an increase in load on the feeder circuits.

An additional object of my invention is to provide compensating means of the above-indicated character, which are relatively simple and compact in construction and efficient and reliable in operation.

My invention will best be understood from the following description of a specific embodiment thereof, when taken in conjunction with the accompanying drawing, in which:

Figure 1 is a simplified single-line diagrammatic representation of a power-transmission and distribution system utilizing regulators to which the improved control and compensating means of my invention are particularly applicable.

Fig. 2 is a diagrammatic view of apparatus and circuits organized in accordance with my invention when disposed to control the regulators in two parallel-connected feeder circuits of the type shown in the system of Fig. 1.

Figs. 3, 4 and 5 are vector diagrams illustrating the action of the compensating means associated with the regulators shown in Fig. 2.

Recent practice in power transmission and distribution systems has introduced a type of circuit combination of which the single line diagram of Fig. 1 is representative. In the system of Fig. 1, an alternating-current power source 10 which may include one or more generating stations, energizes a plurality of high-voltage transmission lines 11 and 12 at the ends of which are located step-down transformers 13 and 14. From these transformers, which reduce the power voltage to an intermediate value, a plurality of feeder circuits 15 and 16 supply power to a distribution-network circuit 17. From the network circuit, a plurality of low-voltage-consumption-circuit groups 19, 20 and 21 are energized through distribution transformers 22, 23 and 24.

In order that the voltage in the consumption circuits may be maintained substantially constant for changing load and supply circuit conditions, regulating apparatus is required in the power-supply circuits. In practice, it is found preferable to provide such regulating devices in the medium-voltage feeder circuits at some such locations as are indicated at 26 and 27, in the system of Fig. 1. Devices 26 and 27 may be induction regulators of well known type, or may comprise tap-changing under-load equipments suitably associated with the power transformers in the feeder circuits.

The nature of the medium-voltage distribution network system 17, and the incoming feeder circuits 15 and 16, is such that only a small value of impedance is present in the circuits which in effect connects regulating devices 26 and 27 in parallel. However, in practice, the regulators are required to be some distance apart so that direct connection between their control circuits is impractical.

It is well known that when the distribution or consumption point is removed from the transmission line or feeder circuit, variations in load produce variations in voltage drop in the distribution circuit. Hence, to maintain a constant voltage at the center of distribution, it has been customary to provide compensating means so arranged as to energize the regulator control element by a potential that corresponds to that which exists at the remote point. Since the supply circuits introduce line drops caused by both the resistance and reactance components of their impedance, compensators are provided with ohmic and inductive elements that are effective to respectively compensate for these two components of voltage drop in the line impedance.

When such compensating means are applied to regulators connected in parallel through low impedance circuits of the type illustrated in the system of Fig. 1, it is found that the regulators are caused to interact on one another in a manner that circulating currents are set up as before mentioned. The power factor of these currents is extremely low, they bearing a substantially quadrature phase relation with respect to the circuit voltages.

In the absence of direct connection between the control systems of the regulators, it has in the past been necessary either to dispense with the load compensators or to give them a negative or drooping action to permit of satisfactory parallel operation of the regulators. Hence, it is apparent that a serious limitation was thereby imposed upon distribution systems of the type shown in Fig. 1, since the voltage at the consumption centers could be but inadequately controlled for changes in load.

I have discovered that in applications of this kind load compensators can be successfully applied if they are so arranged that the regulators will be given a droop in proportion to the wattless component of feeder circuit output and a boost in proportion to the power component of this current.

In Fig. 2 is illustrated that portion of the power-distribution system of Fig. 1 which includes regulators 26 and 27 in the feeder circuits 15 and 16 connected with distribution circuit 17. Although a single-phase system has been shown in Fig. 2, it will be understood that my invention is likewise applicable to regulators associated with circuits having a plurality of phases. It will further be understood that the beneficial stability results effected by my invention are not limited to the combination of but two parallel-operated regulators but are equally-effective in applications in which more than two feeder-circuit regulators are to be operated in systems having low values of circuit-paralleling impedance.

Regulators 26 and 27 are illustrated as being of the well-known induction type which respectively comprise series windings 30 and 31 connected to introduce corrective voltages into the associated feeder circuits 15 and 16, and exciting windings 33 and 34 energized by the voltages acting in these respective feeder circuits. It will be understood that, in a regulator of this type, the magnitude and direction of the corrective voltage introduced by the series winding is controlled by shifting the inductive relation of the series and the exciting windings, such as by mechanically moving or rotating the plane of one winding with respect to the plane of the other in a well known manner.

As shown, regulators 26 and 27 are respectively operated by means of reversible motors 36 and 37 mechanically connected thereto through suitable gearing. The motor 37 comprises an armature winding 39 and differentially-related series-field windings 40 and 41. Contact-making volt-meters or primary relays 43 and 44 are provided for effecting the control of motors 36 and 37 by connecting them to sources of electrical energy, such as batteries 46 and 47, to thereby control the operation of regulators 26 and 27 respectively.

A contact making volt-meter 44, comprises fixed contact members 49 and 50, and a movable contact member 51 that is adapted to engage members 49 and 50. Contact member 51 is actuated by an operating winding 53.

The motor 37 is caused to rotate in the voltage-raising direction when contact members 51 and 50 of primary relay 44 are brought into engagement, and in the voltage-lowering direction when members 51 and 49 are similarly engaged. Closure of a circuit through the first-named set of contacts takes place when the voltage impressed upon winding 53 of primary relay 44 drops below a predetermined value, and closure of the last-named set of contact members is similarly effected when the control potential impressed upon the relay winding rises above a given value. Hence it will be seen that the regulator will be operated to maintain at a constant value the voltage which energizes its primary relay.

A potential transformer 56, having a primary winding energized by the voltage across feeder circuit conductors 16, impresses upon the operating winding of primary relay 44 a potential corresponding to the magnitude of this feeder-circuit voltage. A line-drop compensating means, indicated generally at 60, is connected in the circuit of the secondary winding of the transformer 56 and of the operating winding of relay 44.

The compensating means 60 comprises an ohmic or resistor element 61, and an inductive or reactive element 62 which are connected in series-circuit relation in the primary-relay energizing circuit, and which are arranged to be acted upon by the current flowing in the regulated feeder circuit 16 through a suitable current transformer 64. In order that both instrument transformers 56 and 64 may be grounded, if desired, to obtain greater insulation protection, an insulating transformer 66 is connected in a well-known manner intermediate the circuit of current transformer 64 and the ohmic compensating element 61.

Compensating equipment 67 associated with the regulator 26 in the feeder circuit 15 is represented as being a duplicate of that shown and described for regulator 27 of circuit 16, hence, no detailed description of it is given at this point.

The inductive element 62 of equipment 60 comprises a transformer-reactor which is illustrated as being provided with tap connections 68 on its primary winding and having end connections 70 and 71 from the secondary winding connected in the primary-relay energizing circuit. Transformer-reactor 62 may be of the well known design, utilized in the usual compensating-circuit applications, which has a magnetic circuit provided with an air gap such that the secondary voltage will bear a quadrature phase relation with respect to the primary energizing current.

In the operation of the compensating means 60, the resistor element 61 has set up therein a voltage drop that is in phase with the current flowing in the regulated-feeder circuit while reactance element 62 has set up therein a voltage drop which bears a quadrature phase relation with respect to the current supplied from the feeder circuit through current transformer 64. This latter relation obtains, since transformer-reactor 62 has set up in its core a flux in phase with the primary current, and has induced in the secondary winding a voltage which is 90° behind this flux and current.

It will thus be seen that by properly adjusting the magnitude of the voltage drop in the ohmic element 61, as by shifting tap connections 73, a voltage that is proportional to the ohmic component of voltage drop in the feeder and distribution circuit may be introduced into the circuit of the relay 44 and by similarly adjusting the magnitude of the potential induced in the secondary of transformer-reactor 62, as by shifting tap connections 68, a voltage that is proportional to the reactance component of voltage drop in the feeder and distribution circuit may likewise be introduced into the circuit of the relay 44.

In accordance with my invention, the reactance element 62 is so connected, in the diagram of Fig. 2, that the controlled regulator will be given a drooping voltage characteristic with an increase in the wattless component of current in the feeder circuit. By somewhat increasing the compensating action of ohmic element 61, above that corresponding to the ohmic voltage drop in the circuit, I have discovered that the performance of a regulator so controlled will be entirely satisfactory from the stand-point of voltage constancy at a distant point in the distribution system. Such an adjustment of the compensating elements of the regulator possesses the important advantage of eliminating the tendency of parallel-connected regulators to set up objectionable circulating currents in their associated circuits. The action of the compensating means of my invention is more clearly illustrated by the vector diagrams of Figures 3, 4 and 5.

Fig. 3 is drawn to represent the relations that exist when the regulated-feeder circuit 16 supplies a current that is completely in phase with the voltage. The vector $E_1$ designates the feeder-circuit voltage at the potential transformer 56 while $I_p$ designates the current flowing in the circuit which influences the ohmic and inductive compensating elements 61 and 62 through current transformer 64. The voltage $E_2$, impressed upon the winding 53 of the primary relay 44, when combined with compensating components IR and IX, respectively introduced by elements 61 and 62, will equal the voltage $E_1$ supplied by transformer 56, as is shown. It will be noted that the inductive component IX, due to the connection of the inductive element provided by my invention, has the particular direction indicated instead of that given by dotted vector 75, which the usual compensating means provide.

Since the regulator operates to maintain the voltage $E_2$, which energizes the primary relay (at a constant value) changes in the magnitude of the current $I_p$, will effect corresponding changes in the voltage $E_1$ at the regulator; increases in this current acting, by increasing component IR, to raise the value of $E_1$, and similarly decreases in the current acting to lower the value of $E_1$. Inductive component IX follows similar changes, but due to its quadrature relation with respect to voltage $E_1$ the magnitude of change which it effects is negligible for the 100% power-factor condition.

The diagram of Fig. 4 has been drawn to illustrate the compensating action when the current $I_c$ flowing in the regulated circuit is in quadrature with the voltage. The compensating components I'R and I'X now have the relative positions shown with respect to voltage $E_2$ and $E'_1$. It will be seen that this relation is such that the inductive component I'X acts to directly reduce, in accordance with the magnitude of quadrature current $I_c$, the voltage $E'_1$ which the regulator maintains at its location in the feeder circuit. It will be apparent, therefore, that the regulator is thus given a drooping characteristic with respect to the quadrature or wattless component of current flowing in the regulated circuit, of which variety the circulating currents are representative. It will likewise be seen from the diagram of Figure 4 that in the usual connection of the inductive element in which the compensating component has the direction given by vector 75', the regulator would have a rising characteristic with respect to wattless current which has the objectionable effect already discussed in a system of the type shown and described in Figs. 1 and 2.

In the vector diagram of Fig. 5, a load current $I_L$, which lags, by the angle alpha, behind the voltage $E''_1$ acting in the feeder circuit at the regulator, is indicated as being representative of an average or usual operating condition of a power distribution system of the type shown in Fig. 1. When the regulator is controlled by compensating means arranged in accordance with my invention, the components I''R and I''X combine with voltage $E''_1$ in the manner shown to impress upon the primary relay of the regulator the voltage $E_2$. The relation between voltages $E_2$ and $E''_1$ in the diagram of Fig. 5, will be seen to be such that the regulator is given an over-all rising characteristic for the particular power factor of regulated-circuit current.

It will be apparent, therefore, that when parallel-operated regulators are controlled through load-compensating means arranged in accordance with my invention, the compensation will be of such a nature that the regulator that is taking the larger part of the load will be actuated in a direction to reduce the voltage of its associated feeder circuit, and the regulator which is taking less than its share of the load will be actuated in a direction to increase the voltage of its associated feeder circuit, thus decreasing the current flowing between the feeder circuits and maintaining it at substantially zero.

If desired, the ohmic or resistance setting of the compensator may be considerably increased over that required for compensating for the ohmic voltage drop in the line. When the power factor of the current through the regulated circuit is high, as will usually be the case in applications of the type under consideration, the resistance compensation causes the desired boost in voltage. When the power factor of the current is low, as may occur at light load or when circulating current might be set up, the inductive element produces the desired bucking of the voltage. The controlled regulator thus, in effect, tends to shirk taking more current at low power-factor, but at high power-factor currents compensates for line drop in the usual manner.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In an electrical system, a distribution circuit, a source of alternating current, a plurality of feeder circuits connecting said distributing circuit and said source, a voltage-regulating means connected in each of said feeder circuits, a voltage-responsive means associated with each regulating means and adapted to control the operation thereof, and load-compensating means connected in circuit with each voltage-responsive means for modifying the action of said responsive means, each of said compensating means comprising an inductive element acted upon by the current which flows in the feeder circuit with which that means is associated, each of said inductive elements being disposed to give the associated voltage-regulating means a drooping characteristic with respect to the wattless component of the said feeder-circuit current which acts thereon.

2. In an electrical system, a distribution circuit, a plurality of feeder circuits each connecting said distribution circuit to a source of alternating current, a voltage-regulating means connected in each of said feeder circuits, a voltage-responsive means associated with each regulating means and adapted to control the operation thereof, and load-compensating means connected in circuit with each voltage-responsive means for modifying the action of said responsive means, each of said compensating means comprising an ohmic element and an inductive element acted upon by the current flowing in the associated feeder-circuit, said ohmic element being effective to compensate for voltage drop caused by the power component of said feeder-circuit current, and said inductive element being effective to give the voltage-regulating means a drooping voltage characteristic upon an increase in the wattless component of said feeder-circuit current.

3. In an electrical system, a distribution circuit, a plurality of feeder circuits connected to supply power to said distribution circuit, a voltage-regulating means connected in each of said feeder circuits, a contact-making voltmeter associated with each regulating means for controlling the operation thereof, means for impressing upon the windings of said voltmeters control potentials which vary in accordance with the voltage at predetermined points in their associated feeder circuits, a compensating device including an ohmic element and an inductive element in the circuit of the operating winding of each of said voltmeters, means responsive to the current flowing in the associated feeder circuit for producing voltage differences across said elements to thereby modify the potential impressed upon the winding of the associated voltmeter, said ohmic element acting to give the regulating means a rising voltage characteristic upon an increase in the power component of current in said feeder circuit, and said inductive element acting to give the regulating means a drooping voltage characteristic upon an increase in the wattless component of current in said feeder circuit.

4. In an electrical system, a distribution circuit, a plurality of feeder circuits each connecting said distribution circuit to a source of alternating current, a voltage-regulating means connected in each of said feeder circuits, and means, including a line-drop compensator, for controlling and compensating the operation of each of said regulating means, each of said compensators being disposed to give the regulating means a drooping characteristic with respect to the wattless component of regulated-circuit current in order to effect stable operation of the several regulating means.

EDWARD R. WOLFERT.